US012561637B2

(12) United States Patent
Youn et al.

(10) Patent No.: US 12,561,637 B2
(45) Date of Patent: Feb. 24, 2026

(54) HYDROGEN MONITORING APPARATUS AND HYDROGEN MANAGEMENT SYSTEM

(71) Applicant: DOOSAN ENERBILITY CO., LTD., Changwon (KR)

(72) Inventors: Ju Young Youn, Yongin (KR); Seock Moon Yoon, Daejeon (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 162 days.

(21) Appl. No.: 18/591,079

(22) Filed: Feb. 29, 2024

(65) Prior Publication Data

US 2024/0412152 A1 Dec. 12, 2024

(30) Foreign Application Priority Data

Jun. 8, 2023 (KR) ......................... 10-2023-0073359

(51) Int. Cl.
    G06Q 10/0832 (2023.01)
    G08B 21/18 (2006.01)
(52) U.S. Cl.
    CPC ......... G06Q 10/0832 (2013.01); G08B 21/18 (2013.01)
(58) Field of Classification Search
    CPC ................. G05B 23/0283; Y02P 80/10; F17C 2223/0123; F17C 2221/012; F17C 5/06; F17C 2270/0184; B60L 53/54
    See application file for complete search history.

(56) References Cited

U.S. PATENT DOCUMENTS

2020/0103894 A1* 4/2020 Cella ................. G05B 19/41845
2022/0018498 A1* 1/2022 Asai ................... G06Q 10/0832
2022/0367891 A1* 11/2022 Park ..................... B67D 7/0401
2023/0259088 A1* 8/2023 Borup .................... G06Q 10/06
                                                            700/9
2025/0216032 A1* 7/2025 Rønne ....................... F17C 5/06

FOREIGN PATENT DOCUMENTS

| KR | 10-1025382 | B1 | 3/2011 |
|---|---|---|---|
| KR | 10-1340314 | B1 | 12/2013 |
| KR | 10-2017-0123056 | A | 11/2017 |
| KR | 10-2022-0087004 | A | 6/2022 |
| KR | 10-2022-0122469 | A | 9/2022 |
| KR | 10-2022-0138299 | A | 10/2022 |
| KR | 10-2522717 | B1 | 4/2023 |
| KR | 10-2023-0112119 | A | 7/2023 |
| KR | 10-2576289 | B1 | 9/2023 |
| KR | 10-2023-0153187 | A | 11/2023 |

OTHER PUBLICATIONS

The KR Office Action, dated Aug. 28, 2025.

* cited by examiner

*Primary Examiner* — Mirza F Alam
(74) *Attorney, Agent, or Firm* — Harvest IP Law, LLP

(57) ABSTRACT

Proposed is a hydrogen management system in which location information, pressure information, temperature information, collision information, hydrogen concentration information, and flow rate information are transmitted from sensors mounted in a manifold of each of a plurality of tube trailers (T1, T2, . . . ), and the hydrogen consumption amount, the remaining hydrogen amount, the number of users, etc. are transmitted from the plurality of hydrogen charging stations (S1, S2, . . . ) so that current hydrogen storage and demand amounts are predicted, thereby managing an entire hydrogen cycle, including hydrogen production, in an integrated manner.

14 Claims, 5 Drawing Sheets

HYDROGEN MONITORING APPARATUS AND HYDROGEN MANAGEMENT SYSTEM

CROSS REFERENCE TO RELATED APPLICATION

The present application claims priority to Korean Patent Application No. 10-2023-0073359, filed on Jun. 8, 2023, the entire contents of which are incorporated herein for all purposes by this reference.

BACKGROUND

1. Technical Field

The present disclosure relates to a hydrogen monitoring apparatus and a hydrogen management system.

2. Description of the Related Art

Air pollution, especially, an increase in fine dust, is steadily emerging as a social problem. There are various causes of fine dust, but exhaust gases from internal combustion engine vehicles that use fossil fuels are the main cause of fine dust. To solve this problem, research is continuing to reduce pollutants emitted from automobile exhaust gases. In addition, in order to more actively solve the problem, electric vehicles and hydrogen vehicles have emerged, and their utilization is on the rise.

As the number of hydrogen vehicles rises, demand for hydrogen fuel is increasing. Unlike internal combustion vehicles, hydrogen vehicles do not yet have sufficient charging infrastructure. However, convenience is improving with the growing number of hydrogen charging stations nationwide.

Hydrogen may easily explode when it comes in contact with oxygen, so the stability of storage containers and transport vehicles is important. Hydrogen fuel is stored as high-pressure gas at a level of 200 bar within a metal hydrogen transport container, which is then transported via a tube trailer. It is necessary to continuously monitor to ensure that hydrogen does not leak and to mitigate the risk of explosion during the transport process. In addition, there is a need to control an entire hydrogen fuel supply system, including determining the production amount of hydrogen fuel by identifying the remaining amount of hydrogen fuel currently produced.

Accordingly, there is a need to develop a system that monitors the status and safety of hydrogen fuel in transport vehicles and a system that can determine the amount of hydrogen fuel stored in a running hydrogen fuel transport vehicle.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a hydrogen monitoring apparatus and a hydrogen management system, in which an entire hydrogen cycle can be managed in an integrated manner.

The present disclosure is intended to provide a hydrogen monitoring apparatus and a hydrogen management system, in which whether hydrogen is leaking from the tube trailer that transports hydrogen and the state of the tube trailer can be managed in an integrated manner.

A hydrogen monitoring apparatus according to an embodiment of the present disclosure is an apparatus that monitors a current state of hydrogen of a plurality of tube trailers and a plurality of hydrogen charging stations. The hydrogen monitoring apparatus includes a sensor unit, a sensing information processing unit, and a control server. The sensor unit may be mounted in a manifold of each of the plurality of tube trailers. The sensing information processing unit may include a first communication module that receives pieces of sensing information from the sensor unit, and a controller that processes the received sensing information. The sensing information processing unit may be installed in each of the plurality of hydrogen tube trailers. The control server may receive at least one of the pieces of sensing information from the sensing information processing unit of each of the plurality of tube trailers and monitor states of the plurality of tube trailers.

In the hydrogen monitoring apparatus according to the embodiment of the present disclosure, the sensor unit may include at least one of a position sensor, a pressure sensor, a temperature sensor, a collision detection sensor, a gas leak detection sensor, and a flow rate sensor.

In the hydrogen monitoring apparatus according to the embodiment of the present disclosure, the pressure sensor may be installed on a pipe disposed inside the manifold.

In the hydrogen monitoring apparatus according to the embodiment of the present disclosure, the flow rate sensor may be installed on an upstream side of a pipe disposed inside the manifold.

In the hydrogen monitoring apparatus according to the embodiment of the present disclosure, the sensing information processing unit may transmit at least one piece of information of the plurality of pieces of received sensing information to the control server.

In the hydrogen monitoring apparatus according to the embodiment of the present disclosure, the controller may determine whether hydrogen is leaking on a basis of the sensing information and send an alarm to a driver or the control server when it is determined that a hydrogen leak occurs.

In the hydrogen monitoring apparatus according to the embodiment of the present disclosure, the control server may calculate a location and a hydrogen storage amount of each of the plurality of tube trailers on a basis of location information and pressure information received from the sensing information processing unit of each of the plurality of tube trailers.

The hydrogen monitoring apparatus according to the embodiment of the present disclosure may further include a small energy storage device.

In the hydrogen monitoring apparatus according to the embodiment of the present disclosure, when an internal power voltage of the tube trailer is equal to or less than a predetermined value, the controller may switch so that the sensor unit receives power from the small energy storage device.

A hydrogen management system according to an embodiment of the present disclosure includes at least one first communication part, at least one second communication part, and the control server. The first communication part may be mounted in a manifold of each of a plurality of tube trailers and transmit and receive sensing information sensed from the manifold. The second communication part may be installed in each of a plurality of hydrogen charging stations and configured and transmit and receive operational information of the hydrogen charging stations. The control server may receive the sensing information and the operational information from the first communication part and the second communication part, respectively. The control server may calculate a total storage amount of hydrogen stored in the plurality of tube trailers on a basis of the sensing information received from the first communication part.

In the hydrogen management system according to the embodiment of the present disclosure, the sensing information may be at least one of location information, pressure information, temperature information, collision information, hydrogen concentration information, and flow rate information. The operational information may be at least one of a hydrogen consumption amount, a remaining hydrogen amount, and the number of users at each of the plurality of hydrogen charging station.

In the hydrogen management system according to the embodiment of the present disclosure, when the total storage amount of hydrogen stored in the plurality of tube trailers is equal to or less than a reference value, the control server may transmits a communication system of a hydrogen production facility to produce hydrogen.

In the hydrogen management system according to the embodiment of the present disclosure, when a sum of the total storage amount of hydrogen stored in the plurality of tube trailers and a remaining hydrogen amount of the hydrogen charging stations is equal to or less than a reference value, the control server may instruct the hydrogen production base to produce hydrogen.

In the hydrogen management system according to the embodiment of the present disclosure, the control server may predict the amount of hydrogen demand based on the operational information.

In the hydrogen management system according to the embodiment of the present disclosure, the control server may match a hydrogen charging station with a tube trailer, which is nearest to the hydrogen charging station from among the plurality of hydrogen tube trailers, and transmit information about the matched hydrogen charging station to the first communication part of the matched tube trailer.

In the hydrogen management system according to the embodiment of the present disclosure, when a hydrogen leak of the tube trailer is detected, the control server transmits a location of the tube trailer having the hydrogen leak to a communication system of a fire department which is located a shortest distance from the tube trailer.

In the hydrogen management system according to the embodiment of the present disclosure, the plurality of tube trailers and the plurality of hydrogen charging stations are grouped and matched by region on a basis of location information of the hydrogen tube trailers and the hydrogen charging stations.

According to the embodiment of the present disclosure, an entire hydrogen cycle can be managed by identifying the amount of hydrogen stored in a plurality of hydrogen tube trailers in real time, and the current state of hydrogen, such as a hydrogen leak, can be monitored.

DETAILED DESCRIPTION

Figure 1:
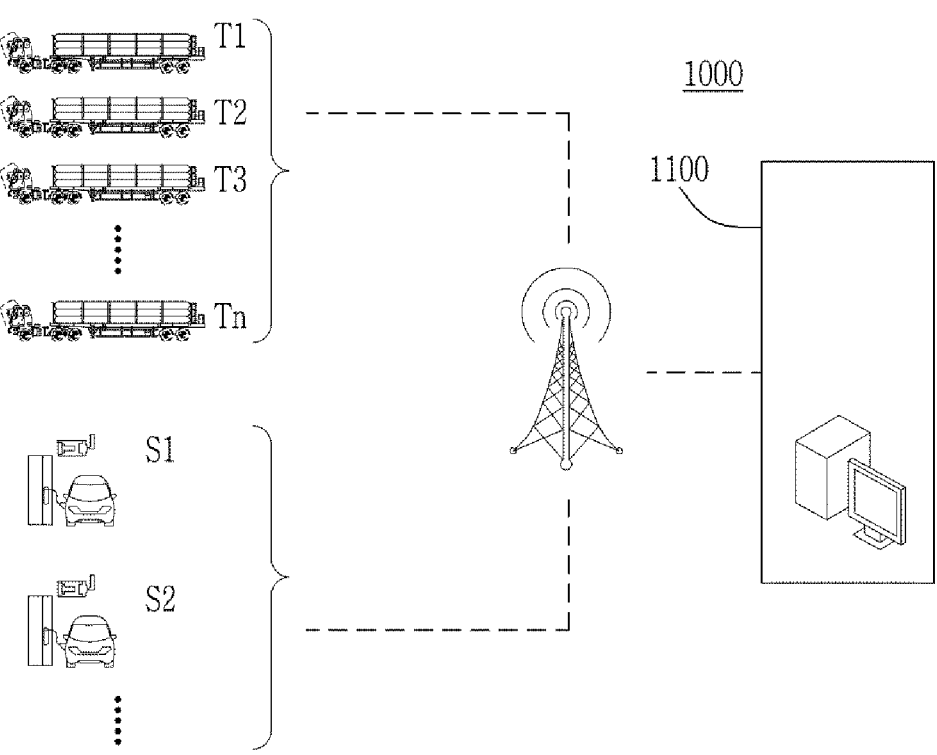
FIG. 1 is a view schematically illustrating a hydrogen management system of the present disclosure.

Since the present disclosure can be modified in various ways and can have various embodiments, specific embodiments will be exemplified and explained in detail in the detailed description. However, it should be noted that the present disclosure is not limited to the specific embodiments, and may include all of modifications, equivalents, and substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, the exemplary embodiments of the present disclosure will be described in detail with reference to the accompanying drawings. It should be noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
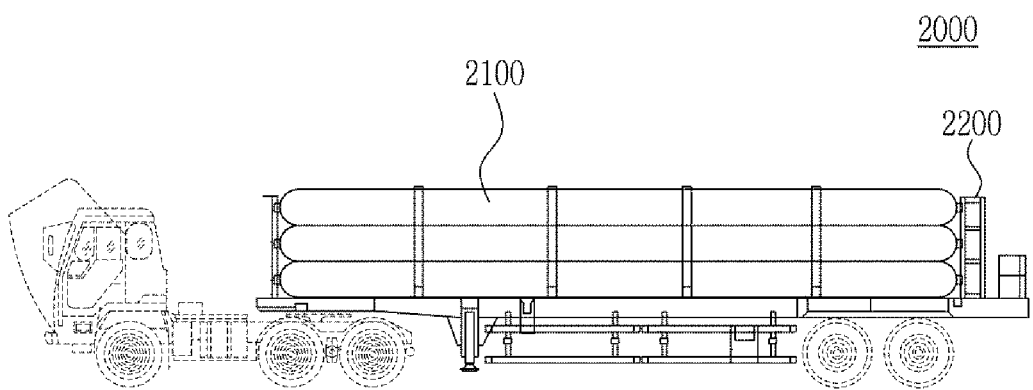
FIG. 2 is a view illustrating a tube trailer.

FIG. 1 is a view schematically illustrating a hydrogen management system of the present disclosure, and FIG. 2 is a view illustrating a tube trailer.

As illustrated in FIG. 1, the hydrogen management system 1000 according to the embodiment of the present disclosure includes a plurality of first communication parts mounted respectively in a plurality of tube trailers T1, T2, . . . , and Tn, a plurality of second communication parts installed respectively in a plurality of hydrogen charging stations S1, S2, . . . , and Sn, and a control server 1100.

A plurality of tube trailers T1, T2, . . . , and Tn may be utilized in the embodiment of the present disclosure. As illustrated in FIG. 2, the tube trailer 2000 may include a hydrogen storage tank 2100 and a manifold 2200. In the hydrogen storage tank 2100, hydrogen fuel is compressed at high pressure and stored. The hydrogen storage tank 2100 may have a tube shape extending in the longitudinal direction of a vehicle. A plurality of hydrogen storage tanks 2100 may be arranged in a stacked configuration with their opposite ends thereof may be fixed or secured to a skid. In this embodiment, the plurality of hydrogen storage tanks 2100 is arranged to be stacked on each other, but the present disclosure is not limited thereto. A hydrogen storage tank configured as a single integrated tank may also be used. The manifold 2200 may be connected to one side of each of the plurality of hydrogen storage tanks 2100.

The manifold 2200 has a connector connected to the outside of the manifold 2200. The connector may branch into a plurality of pipes. Each of the pipes may be connected to the hydrogen storage tank 2100, allowing hydrogen to be distributed, stored, and supplied to the outside. A plurality of pipes and valves connected to one side of the plurality of hydrogen storage tanks 2100 is disposed in the manifold 2200. The plurality of valves disposed in the manifold 2200 may be controlled to open and close in order to store hydrogen in the hydrogen storage tank 2100 or charge the charging station with the stored hydrogen.

There is a potential risk of a hydrogen leak at the connection point between the hydrogen storage tank 2100 and the manifold 2200. Especially, noteworthy is the fact that hydrogen has a low ignition energy, introducing a constant risk of explosion and fire. According to an embodiment, a plurality of sensors are installed on the inside and outside of the housing of the manifold 2200 and on pipes within the manifold 2200 so as to check and monitor the status of a hydrogen tube trailer 2000. For example, a plurality of sensors mounted on the manifold 2200 are capable of determining the amount of hydrogen stored in the hydrogen storage tank, detecting potential hydrogen leaks, and detecting impacts. The sensors may be IoT sensors.

Each of the first communication parts is mounted on the manifold 2200 of the tube trailer 2000. A plurality of sensors is disposed in the manifold 2200 of the tube trailer 2000 to measure information about the state of stored hydrogen. Sensing information may include at least one of location information, pressure information, temperature information, collision information, hydrogen concentration information, leak information, and flow rate information. The location information may be information on a location of the tube trailer 2000, such as GPS information. The pressure information, temperature information, hydrogen concentration information, and flow rate information may be information on pressure, temperature, concentration, and flow rate of the hydrogen, respectively, in the hydrogen storage tank 2100 and/or in the manifold 2200. The collision information may be information on any collision or physical impact experienced by the tube trailer. The leak information may be information on any leak of hydrogen from the hydrogen storage tank 2100 or in the manifold 2200 detected by a sensor.

Information sensed by the plurality of sensors from the tube trailer 2000 is transmitted to the control server 1100 through the first communication part. The first communication part of the tube trailer 2000 collects the sensing information within the manifold by using network communication protocols. The sensing information may be transmitted through the local area network (WiFi, and Bluetooth, etc.) and/or broadband communication networks (3G, and LTE, etc.) to the control server 1100. The first communication part may support any kinds of wireless network such as Bluetooth, Wi-Fi, and LTE methods, and may be an explosion-proof wireless transmitter. Network communication protocols may be any kinds of communication protocol such as a controller area network (CAN), Ethernet, a media oriented systems transport (MOST), and Bluetooth, etc.

The first communication part receives a plurality of pieces of sensing information from the plurality of sensors. All the sensed information may be transmitted to the control server 1100, or alternatively certain information may be filtered/processed and then transmitted to the control server 1100. Depending on the type of the sensing information, a transmission cycle to the control server may vary. For example, pressure information may be transmitted to the control server 1100 every 10 minutes. Sensing information about hydrogen leaks, that is leak information, may be transmitted to the control server 1100 every one minute. According to an embodiment, the first communication part may transmit the pressure information and/or the hydrogen concentration information to the control server 1100 only when pressure information is equal to or less than a predetermined value, or hydrogen concentration is greater than or equal to a predetermined value.

In addition to the sensing information obtained by the sensors, the first communication part may also transmit tube trailer operation information to the control sever 1100. For example, information on the location, driving distance, breakdown, and/or condition, etc. of the tube trailer may be collected and transmitted to the control server 1100.

Information sensed from the tube trailer 2000 may be transmitted not only to the control server 1100 but also to a trailer controller installed in the tube trailer 2000. The trailer controller may determine whether there is an emergency situation based on the sensed information and send a warning to a driver in real time.

Each of the hydrogen charging stations S1, S2, . . . , and Sn receives hydrogen from the tube trailer 2000. Each of the hydrogen charging stations S1, S2, . . . , and Sn may have a plurality of sensors installed therein to collect information necessary for hydrogen management for the hydrogen charging stations. Information required for hydrogen management for the hydrogen charging stations includes the hydrogen consumption amount, a remaining hydrogen amount, daily or monthly charging amount, number of users that use the hydrogen charging stations, pressure, temperature, flow rate of the hydrogen and identification information of each of the hydrogen charging stations.

The plurality of sensors and second communication parts may be installed inside each of the hydrogen charging station. The plurality of sensors sense hydrogen status (e.g., pressure, temperature, flow rate, leak of the hydrogen) and operational information (e.g., consumption, remainder, daily/monthly charging amount, number of users, identification of the charging stations) within the hydrogen charging station. The plurality of sensors may transmit the sensing information to a second communication part at regular intervals. Information sensed from the hydrogen charging stations S1, S2, . . . , and Sn may be transmitted to the control server 1100 through the second communication part. The sensing information may be transmitted to the control server 1100 via a various communication interface such as a local communication network (WiFi, and Bluetooth, etc.) and a broadband communication network (3G, and LTE, etc.).

Sensing information sensed at regular intervals from the plurality of sensors at the hydrogen charging station may also be transmitted to a local server of the hydrogen charging station. When an emergency situation is identified through sensed information, the local server may take necessary actions, such as inducing evacuation or communicating to a fire department.

The control server 1100 controls an entire hydrogen cycle. In order to determine the state of hydrogen, the control server 1100 receives the sensing information and the operational information from the first communication part of the tube trailer and the second communication part of the hydrogen charging station, respectively. The control server 1100 can determine and identify the current location information of the hydrogen tube trailer 2000, a hydrogen storage amount, and a trailer operation state based on the information received from the first communication part. In particular, the control server 1100 can determine the total amount of hydrogen stored in a plurality of hydrogen tube trailers 2000 based on the information received from the first communication part.

In addition, the control server 1100 can determine whether the tube trailer 2000 is in in an emergency situation. For example, when the control server 1100 determines that there is a hydrogen leak from the tube trailer 2000, the control server 1100 can transmit the location of the tube trailer 2000 having the hydrogen leak to a communication system in a fire department locating at the shortest distance from the tube trailer 2000 from among multiple fire departments around the tube trailer 2000.

After the control server 1100 determines a current state of hydrogen based on information transmitted from the plurality of hydrogen tube trailers 2000 and the hydrogen charging stations, the control server 1100 may communicate with a communication system in a hydrogen production base, and instruct the hydrogen production base to produce hydrogen when the amount of hydrogen is equal to or less than a predetermined amount. The control server 1100 may communicate with a communication system in the hydrogen production base through various networks.

The control server 1100 may determine the current location information, hydrogen storage state, and operation state of the hydrogen charging station based on the information transmitted from the second communication part. The operational information transmitted from the second communication part may include at least one of a hydrogen consumption amount, a remaining hydrogen amount, and the number of users.

The control server 1100 may calculate the total amount of hydrogen stored in all tube trailers 2000 based on pressure information received from the plurality of first communication parts. For example, in the case of operating two tube trailers, each of which is designed to carry 300 kg of hydrogen at 200 bar, when the current pressures of the two tube trailers are sensed as 100 bar and 200 bar, respectively, the control server 1000 may determine that the hydrogen storage amounts of the tube trailers are 150 kg and 300 kg, respectively, and that the total current hydrogen storage amount is 450 kg. The total storage amount of hydrogen is the sum of the amount of hydrogen stored in all of the plurality of tube trailers. Depending on the calculated total current storage amount of hydrogen, the control server 1100 can determine whether to communicate to the hydrogen production facility for further production of hydrogen.

In the control server 1100, the calculated total storage amount of current hydrogen may be compared to a reference value. The reference value may be determined based on a daily hydrogen use amount and a daily production amount of hydrogen production facilities. For example, the reference value may be determined based on the sum of the daily hydrogen use amount and the daily production amount of a hydrogen production facility. For example, when the daily hydrogen use amount is 200 kg and the daily production amount is 200 kg, the reference value may be 400 kg.

For another example, when the amount of hydrogen stored in all of the entire tube trailers 2000, that is, when the total storage amount of hydrogen is 1000 kg, a daily hydrogen usage is 200 kg, and a daily production amount is 200 kg, the control server 1100 may determine that hydrogen is not required to be produced immediately. When the total storage amount of hydrogen is 300 kg, the daily hydrogen usage is 200 kg, and the daily hydrogen production is 200 kg, the controller may determine that hydrogen is required to be produced immediately when considering the travel time of the tube trailer.

According to an embodiment, when the total storage amount of hydrogen stored in all tube trailers 2000 is equal to or less than the reference value, the control server 1100 may communicate with the hydrogen production base to request for further production of hydrogen.

In determining whether to produce hydrogen, the control server 1100 may further consider the amount of hydrogen stored in the hydrogen charging stations. For example, the control server 1100 may communicate with the hydrogen production base to produce hydrogen when the sum of the total storage amount of hydrogen stored in all the plurality of tube trailers and the total remaining hydrogen amount in all the hydrogen charging stations is equal to or less than the reference value.

Since travel time of the tube trailers to a hydrogen charging station may vary depending on the location of each of a plurality of tube trailers 2000, the location information of the rube trailers 2000 may be reflected in deriving the amount of hydrogen demand. That is, the control server 1100 may monitor a current state such as a hydrogen storage amount of the tube trailer 2000, a hydrogen storage amount of the charging station, a hydrogen consumption amount, a predicted demand amount at each of the charging station, a trailer dispatch status, and trailer location and status, etc. The control server 1100 may create optimal matching and dispatch schedules between the charging station and hydrogen production base depending on the location and status of the tube trailers 2000.

Meanwhile, when the hydrogen storage amount of a specific hydrogen charging station is insufficient (i.e., equal to or less than a reference amount), the control server 1100 may match a hydrogen tube trailer, which is located at a closest distance from the hydrogen charging station, to the hydrogen charging station based on location information of the tube trailers and the hydrogen charging station. According to the matching decision of the control server 1100, the hydrogen charging station to which the hydrogen tube trailer will move may be determined. The control server 1100 may transmit information on the matched hydrogen charging station to the first communication part. The transmitted information on the matched hydrogen charging station may include location information and identification information of the matched hydrogen charging station.

At the hydrogen charging station, the hydrogen tube trailer may be connected to a panel of the hydrogen charging station so that hydrogen can be stored in a reservoir within the hydrogen charging station. Alternatively, the hydrogen tube trailer may be directly connected to a panel so that fuel can be supplied to a hydrogen vehicle from the hydrogen tube trailer.

Meanwhile, the sensor unit of the tube trailer and the first communication part may receive power from an internal power source of the trailer. When the internal power source of the trailer is unstable, there is a risk that sensing information may not be properly collected or transmitted. Accordingly, the tube trailer may further include a small energy storage device. When the voltage of the internal power source is equal to or less than a predetermined value, the controller of the trailer may switch a sensor unit and the first communication part to receive power from a small energy storage device. For example, the reference voltage of the internal voltage of the tube trailer may be 12V or 24V. When a voltage supplied to the sensor unit is equal to or less than 98% of a reference voltage, an internal power source may be determined to be unstable. In this case, the sensor unit may be switched to receive power from the small energy storage device. The determination of the internal power shortage and switch to the small energy storage device may be performed locally by the sensor unit by itself or by a control of a controller.

According to the present disclosure, each of the hydrogen trailers and the hydrogen charging stations can be monitored so that hydrogen production and supply can be efficiently facilitated. The storage amount of hydrogen from sensed information may be calculated and the consumption amount and predicted demand amount of each of the charging stations may be calculated based on a hydrogen consumption history over a predetermined period of time, ensuring a stable supply and management of hydrogen.

Figure 3:
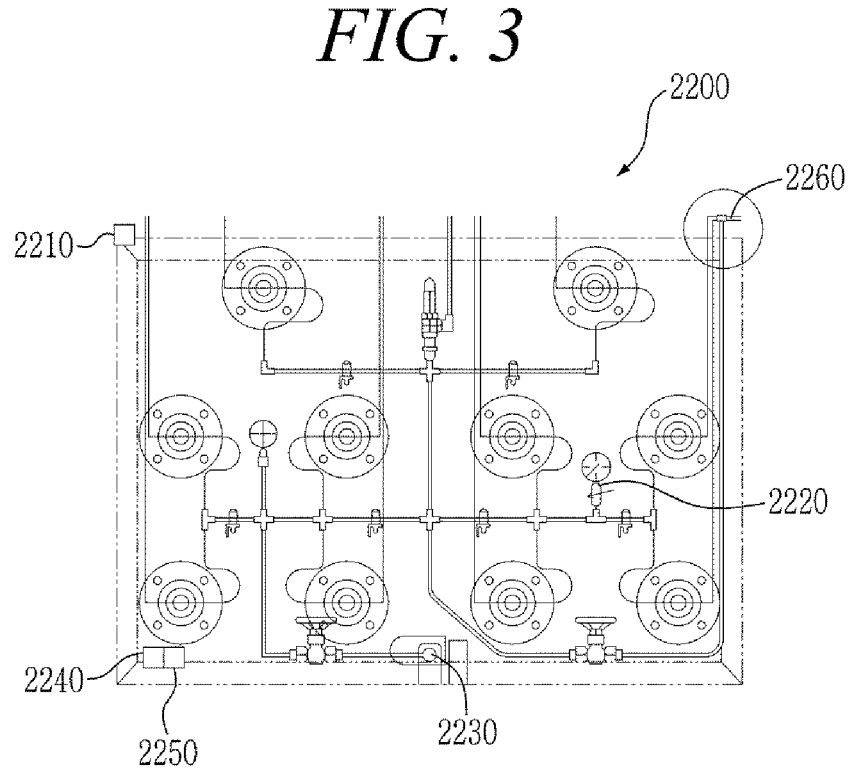
FIG. 3 is a view illustrating a manifold in a hydrogen monitoring apparatus according to an embodiment of the present disclosure.
Figure 4:
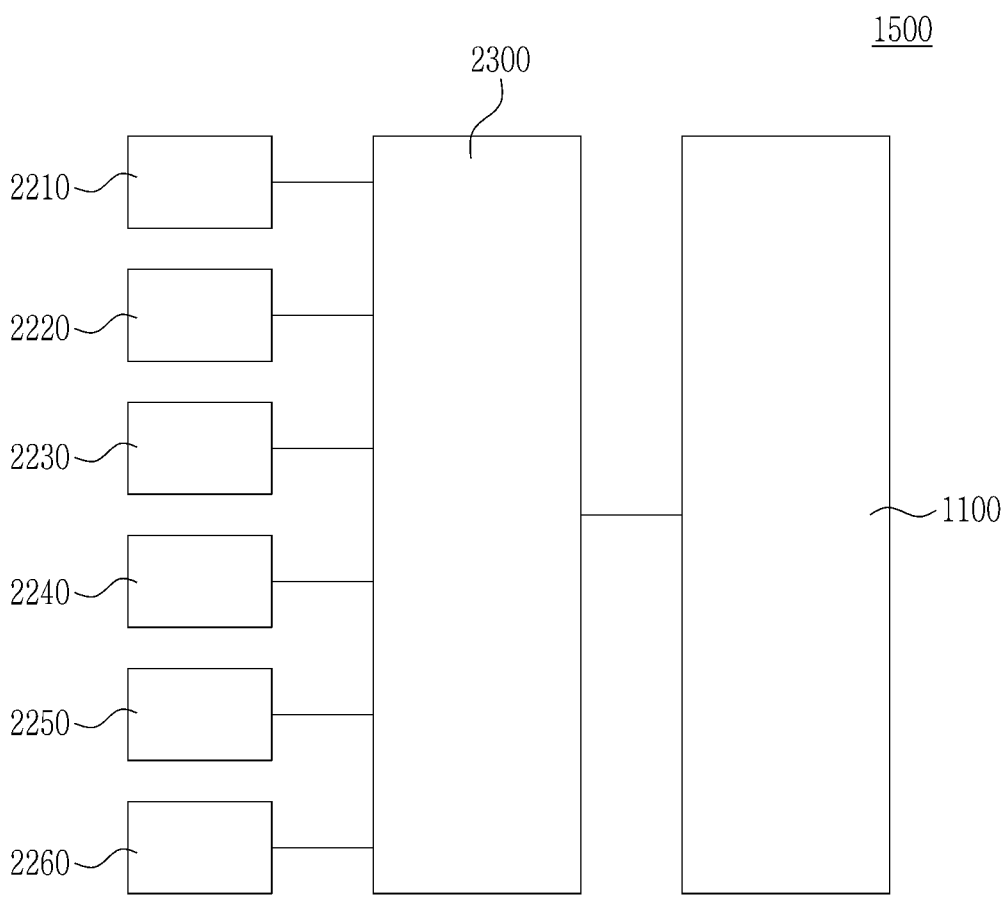
FIG. 4 is a block diagram schematically illustrating the hydrogen monitoring apparatus according to the embodiment of the present disclosure.

FIG. 3 is a view illustrating a manifold in a hydrogen monitoring apparatus according to an embodiment of the present disclosure, and FIG. 4 is a block diagram schematically illustrating the hydrogen monitoring apparatus according to the embodiment of the present disclosure.

The present disclosure relates to the apparatus and system, in which the entire hydrogen cycle is managed by detecting information on hydrogen stored in the tube trailers while the tube trailer is in operation or stopped, and by monitoring the hydrogen stored in the plurality of tube trailers. In the present disclosure, a sensor unit is mounted within the manifold of the tube trailer to monitor the state of stored hydrogen.

The hydrogen monitoring apparatus according to the present disclosure includes the sensor unit, a sensing information processing unit 2300, and the control server.

The sensor unit is mounted in the manifold 2200 as illustrated in FIG. 3. The sensor unit may include a position sensor 2210, a pressure sensor 2220, a flow rate sensor 2230, a gas leak detection sensor 2240, a temperature sensor 2250, and a collision detection sensor 2260.

The position sensor 2210 may be mounted inside the upper part of the manifold. The position sensor 2210 calculates the position (i.e., location) of the tube trailer and transmits the value of the position to the sensing information processing unit 2300. The position sensor 2210 may be a GPS receiver.

The pressure sensor 2220 may be installed on one side of a pipe within the manifold. The manifold is connected to a pipe from each hydrogen storage tank. External hydrogen may flow into the hydrogen storage tank through the manifold. Since hydrogen has a risk of explosion, the pressure sensor 2220 may be provided as an explosion-proof pressure sensor. The pressure sensor 2220 may also calculate the amount of hydrogen stored in each of the plurality of hydrogen storage tanks by measuring pressure in the pipe connected to the hydrogen storage tank. For example, in the case of a tube trailer designed to carry 300 kg of hydrogen at 200 bar, if pressure in a hydrogen storage tank is detected as 200 bar, the stored hydrogen amount may be calculated as 300 kg.

When the measured value of the pressure sensor 2220 is a predetermined value or less, it may be determined that there is lack of hydrogen or a hydrogen leak. In this case, whether there is a hydrogen leak may be determined by comprehensively considering the sensing values of other sensors.

Meanwhile, the pressure sensor 2220 may use a digital sensor. When installing a pressure sensor 2220 in addition to the existing equipment, the manifold, a union T may be placed on one side of an analog gauge so that the digital pressure sensor 2220 can be installed and used. The digital pressure sensor 2220 may transmit measured values to the sensing information processing unit 2300 at predetermined intervals.

The flow rate sensor 2230 may be installed in a pipe disposed inside the manifold 2200. Hydrogen is injected from the outside into each of the hydrogen storage tanks through an inlet of the manifold pipe. The flow rate sensor 2230 may be installed at a position adjacent to the inlet, that is, on the upstream side of the pipe, and measures the amount of hydrogen flowing in or out. The flow rate sensor 2230 may also be provided as an explosion-proof sensor.

The gas leak detection sensor 2240 may be mounted on an inner wall of the manifold and detects hydrogen concentration to determine the leak of hydrogen. When hydrogen leaks, there is a risk of fire or explosion, so the gas leak detection sensor 2240 has a pressure-resistant and explosion-proof structure.

Hydrogen concentration measured by the gas leak detection sensor 2240 is transmitted to the sensing information processing unit 2300 at predetermined time intervals. When measured hydrogen concentration is greater than or equal to a predetermined reference concentration, the sensing information processing unit 2300 determines that there is a hydrogen leak and transmits the emergency situation information to a driver's system and the control server 1100.

The temperature sensor 2250 may be mounted inside the manifold. While the tube trailer is in operation or stops, the temperature sensor 2250 measures a temperature inside the manifold of the tube trailer to detect a fire or explosion. The temperature sensor 2250 is also an explosion-proof sensor. In addition to the temperature sensor 2250, a flame detection sensor may be provided. When a detected temperature exceeds 70° C., it may be determined that a fire has occurred or there is a risk of a fire to occur.

The collision detection sensor 2260 may be mounted on the outer top of the housing of the manifold 2200. The collision detection sensor 2260 may detect an impact applied to the tube trailer, an accident of the tube trailer, or an explosion of the hydrogen storage tank. As the collision detection sensor 2260, a pressure side impact sensor (PSIS) or a front/side impact sensor (FIS/SIS) may be used. PSIS, as a side collision detection sensor, may be a pressure type sensor. FIS/SIS, as a front/side collision detection sensor, may be an accelerometer type sensor. The collision detection sensor 2260 may detect impacts applied to the tube trailer and a storage tank in the early stage of collision and transmit the collision situation to a driver's system, the sensing information processing unit, and the control server.

The sensing information processing unit 2300 may include a first communication module, and the controller. The first communication module may receive sensing information from the sensor unit. The controller can process the received sensing information. The controller may control the operation of the first communication module. The controller may be a central processing unit (CPU) or a semiconductor device or an integrated circuit that may execute processing instructions stored in a memory to perform its functions.

The sensing information processing unit 2300 may be mounted on the manifold. Alternatively, the sensing information processing unit 2300 may be installed on a location of the tube trailer. According to an embodiment, the sensing information processing 2300 may be incorporated in a vehicle system of the tube trailer.

As illustrated in FIG. 4, each of the sensors 2210, . . . , and 2260 may transmit measured values to the first communication module of the sensing information processing unit 2300 at predetermined intervals. The controller of the sensing information processing unit 2300 may store the received measured values in a memory. The controller of the sensing information processing unit 2300 may transmit all the collected information to the control server 1100 without filtering, or may select and transmit only certain information among the collected sensing information thereto. A transmission cycle by the controller may vary depending on the properties of the sensed information.

For example, measured pressure and flow rate values may be transmitted to the control server at relatively short intervals for real-time checking of a hydrogen storage amount and a hydrogen charge amount.

Information on temperature values, hydrogen concentration, and collision detection may be transmitted at relatively long intervals. However, when they exceed a predetermined value, that is, when an event occurs, those sensing values may be transmitted immediately. Location information may be transmitted at regular intervals so that the location of the tube trailer can be identified in real time.

According to the present disclosure, the remaining hydrogen amount stored in the hydrogen tube trailers may be identified by the control server 1100 and reflected in hydrogen operation. Also, the control server 1100 may further receive information on a vehicle's location, a hydrogen storage amount, a hydrogen temperature, a hydrogen leak, hydrogen pressure, and emergency situation information, etc.

Each of the pieces of sensing information sensed by the sensor unit mounted on the manifold may be transmitted to the sensing information processing unit 2300 in the tube trailer. The first communication module of the mounted sensing information processing unit 2300 transmits each of the pieces of sensing information to the control server 1100. Depending on types of sensing information, the sensing information processing unit 2300 may transmit corresponding information to the control server 1100 only when each of the pieces of sensing information is greater than or equal to a predetermined value, that is, when the information corresponds to the occurrence of an event. The controller of the sensing information processing unit 2300 may determine whether hydrogen leak occurs on the basis of the sensing information, and may send an alarm to a driver and/or the control server 1100 when it determines that a hydrogen leak occurs.

The control server 1100 controls an entire hydrogen cycle. The control server 1100 may be a computer-based system including a memory and a network interface. The control server may also include a central processing unit (CPU) or a semiconductor device or an integrated circuit that may execute processing instructions stored in the memory to perform its functions. The control server 1100 may store and process information about each of a plurality of tube trailers T1, T2, . . . , and Tn located at different locations. The control server 1100 may monitor the status of the plurality of tube trailers by receiving at least one of pieces of sensing information from the sensing information processing unit 2300 of the tube trailer. For example, the control server 1100 may calculate the location and hydrogen storage amount of each of tube trailers on the basis of the location information and pressure information of the tube trailers received from the sensing information processing unit 2300 of each of the plurality of tube trailers. According to an embodiment, the control server 1100 may calculate hydrogen storage amount of the tube trailers within a certain area based on the location information of each of the turb trailers.

In addition, the control server 1100 may predict the amount of hydrogen demand and compare the demand amount with the remaining amount of hydrogen to determine whether to request further production of hydrogen. The amount of hydrogen demand may be predicted by analyzing the hydrogen consumption amount of the hydrogen charging station based on previous records, such as the previous year, previous month, and previous week.

When a hydrogen leak of any of the tube trailer T1, T2, . . . , and Tn is detected, the control server 1100 may transmit the location of the tube trailer having the hydrogen leak to a system of a fire department in a shortest distance from the tube trailer.

The hydrogen monitoring apparatus according to the present disclosure may further include the small energy storage device in the tube trailer. The sensor unit and first communication module of the tube trailer may receive power from the internal power source of the tube trailer. When the internal power of the tube trailer is unstable, there is a risk that the sensing information may not be properly collected or transmitted. Accordingly, when an internal power voltage is equal to lower than a predetermine reference voltage, the 'controller may switch the sensor unit and the first communication module to receive power from the small energy storage device. For example, the reference voltage of the internal voltage of the tube trailer may be 12V or 24V. When an voltage supplied to the sensing unit is equal to or less than 98% of a reference voltage, it may be determined that the internal power source is unstable. In this case, the 'controller may switch the sensing unit to receive power from the small energy storage device.

Figure 5:
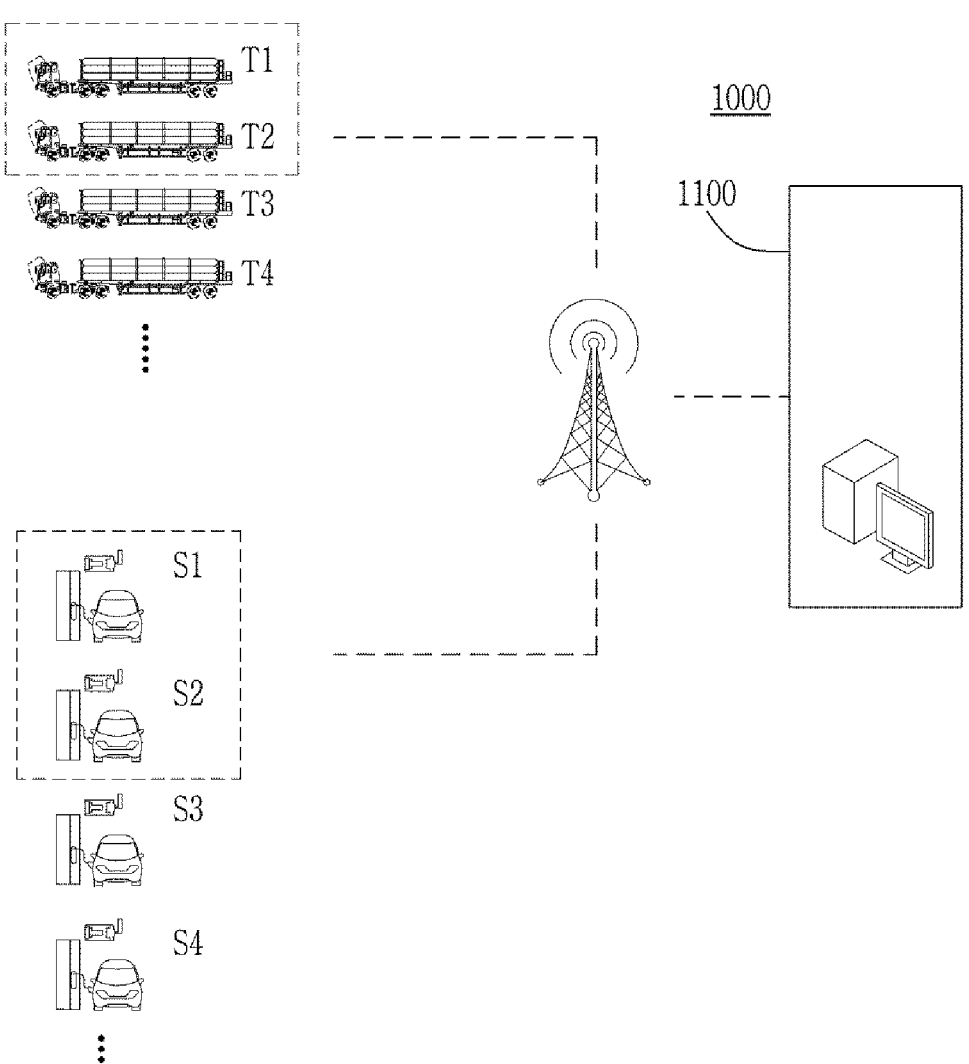
FIG. 5 is a view illustrating a hydrogen management system according to another embodiment of the present disclosure.

FIG. 5 is a view illustrating a hydrogen management system according to another embodiment of the present disclosure.

The plurality of tube trailers T1, T2, . . . , and Tn and the plurality of hydrogen charging stations S1, S2, . . . , and Sn are deployed nationwide. For efficient hydrogen cycle management, the plurality of tube trailers T1, T2, . . . , and Tn and the plurality of hydrogen charging stations S1, S2, . . . , and Sn may each be grouped by region or according to a predetermined condition on the basis of location information.

For example, the plurality of tube trailers T1, T2, . . . , Tn and the plurality of hydrogen charging stations S1, S2, . . . , and Sn may be grouped according to geographic provinces or geographic states by administrative district or grouped so that the number of adjacent hydrogen charging stations satisfies a predetermined range. Alternatively, the plurality of tube trailers and the plurality of hydrogen charging stations may be grouped so that the hydrogen consumption amount of adjacent plurality of hydrogen charging stations falls within a predetermined range on the basis of a hydrogen consumption amount.

The tube trailers T1, T2, . . . , and Tn and the hydrogen charging stations S1, S2, . . . , and Sn within the same group can be managed in an integrated manner, similarly in the manner described above.

According to the present disclosure, the control server 1100 may manage an entire hydrogen cycle in an integrated manner for overall and also for each group by receiving information about trailer operation and information about hydrogen status from the plurality of tube trailers T1, T2, . . . , and Tn, and information about the operation of the hydrogen charging stations from the plurality of hydrogen charging stations S1, S2, . . . , and Sn.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment.

The invention claimed is:

1. A hydrogen monitoring apparatus comprising:

a sensor unit mounted in a manifold of each of a plurality of hydrogen tube trailers and comprising at least one of a position sensor, a pressure sensor, a temperature sensor, a collision detection sensor, a gas leak detection sensor, and a flow rate sensor;

a sensing information processing unit, installed in each of the plurality of hydrogen tube trailers, having a first communication module that receives pieces of sensing information from the sensor unit and a controller that processes the received sensing information; and a control server configured to receive at least one of the pieces of sensing information from the sensing information processing unit of each of the plurality of hydrogen tube trailers and to monitor states of the plurality of hydrogen tube trailers, wherein the sensing information processing unit transmits at least one piece of information of the plurality of pieces of received sensing information to the control server, wherein the sensing information of the pressure sensor and the flow rate sensor is transmitted at a shorter interval than the sensing information of the temperature sensor.

2. The apparatus of claim 1, wherein the pressure sensor is installed on a pipe disposed inside the manifold.

3. The apparatus of claim 1, wherein the flow rate sensor is installed on an upstream side of a pipe disposed inside the manifold.

4. The apparatus of claim 1, wherein the controller determines whether hydrogen is leaking on a basis of the sensing information and sends an alarm to a driver or the control server when it is determined that a hydrogen leak occurs.

5. The apparatus of claim 1, wherein the control server calculates a location and a hydrogen storage amount of each of the plurality of hydrogen tube trailers on a basis of location information and pressure information received from the sensing information processing unit of each of the plurality of hydrogen tube trailers.

6. The apparatus of claim 1, further comprising:

a small energy storage device in the hydrogen tube trailer.

7. The apparatus of claim 6, wherein when an internal power voltage of the hydrogen tube trailer is equal to or less than a predetermined value, the controller switches so that the sensor unit receives power from the small energy storage device.

8. A hydrogen management system comprising:

at least one first communication part mounted in a manifold of each of a plurality of hydrogen tube trailers and configured to transmit and receive sensing information sensed from the manifold;

at least one second communication part installed in each of a plurality of hydrogen charging stations and configured to transmit and receive operational information of the plurality of hydrogen charging stations; and a control server configured to receive the sensing information and the operational information from the first communication part and the second communication part, respectively, wherein the sensing information is at least one of location information, pressure information, temperature information, collision information, hydrogen concentration information, and flow rate information, and wherein the operational information is at least one of a hydrogen consumption amount, a remaining hydrogen amount, and the number of users at each of the plurality of hydrogen charging station, wherein the control server receives the pressure information and the flow rate information at shorter intervals than the temperature information, wherein the control server calculates a total storage amount of hydrogen stored in the plurality of hydrogen tube trailers based on the sensing information received from the first communication part.

9. The system of claim 8, wherein when the total storage amount of hydrogen stored in the plurality of hydrogen tube trailers is equal to or less than a reference value, the control server transmits an instruction to a communication system of a hydrogen production facility to produce hydrogen.

10. The system of claim 8, wherein when a sum of the total storage amount of hydrogen stored in the plurality of hydrogen tube trailers and a remaining hydrogen amount of the hydrogen charging stations is equal to or less than a reference value, the control server instructs the hydrogen production facility to produce hydrogen.

11. The system of claim 9, wherein the reference value is determined according to a daily hydrogen use amount and a daily hydrogen production amount of a hydrogen production facility.

12. The system of claim 8, wherein the control server matches a hydrogen charging station with a hydrogen tube trailer, which is nearest to the hydrogen charging station from among the plurality of hydrogen tube trailers, and transmits information about the matched hydrogen charging station to the first communication part of the matched hydrogen tube trailer.

13. The system of claim 8, wherein when a hydrogen leak of the hydrogen tube trailer is detected, the control server transmits a location of the hydrogen tube trailer having the hydrogen leak to a communication system of a fire department which is located a shortest distance from the hydrogen tube trailer.

14. The system of claim 8, wherein the plurality of hydrogen tube trailers and the plurality of hydrogen charging stations are grouped and matched by region on a basis of location information of the hydrogen tube trailers and the hydrogen charging stations.

* * * * *